United States Patent
Fausett

(10) Patent No.: US 11,795,908 B2
(45) Date of Patent: Oct. 24, 2023

(54) VERTICAL-AXIS RENEWABLE-POWER GENERATOR

(71) Applicant: Carl Almond Fausett, Horicon, WI (US)

(72) Inventor: Carl Almond Fausett, Horicon, WI (US)

(*) Notice: Subject to any disclaimer, the term of this patent is extended or adjusted under 35 U.S.C. 154(b) by 0 days.

(21) Appl. No.: 18/061,288

(22) Filed: Dec. 2, 2022

(65) Prior Publication Data

US 2023/0175479 A1   Jun. 8, 2023

Related U.S. Application Data

(60) Provisional application No. 63/285,448, filed on Dec. 2, 2021.

(51) Int. Cl.
| | |
|---|---|
| *F03D 3/00* | (2006.01) |
| *F03D 3/04* | (2006.01) |
| *F03B 3/18* | (2006.01) |
| *F03D 9/25* | (2016.01) |

(52) U.S. Cl.
CPC ............ *F03D 3/005* (2013.01); *F03B 3/18* (2013.01); *F03D 3/0418* (2013.01); *F03D 3/0445* (2013.01); *F03D 9/25* (2016.05); *F05B 2210/16* (2013.01); *F05B 2220/706* (2013.01); *F05B 2240/12* (2013.01)

(58) Field of Classification Search
CPC .... F03D 3/04–0409; F03D 9/25; F03D 3/005; F05B 2240/212; F03B 3/18
See application file for complete search history.

(56) References Cited

U.S. PATENT DOCUMENTS

| | | | |
|---|---|---|---|
| 4,288,200 A * | 9/1981 | O'Hare | F03D 3/0481 |
| | | | 415/4.4 |
| 7,982,329 B2 | 7/2011 | Lin et al. | |
| 8,382,435 B2 | 2/2013 | Deeley | |
| 9,127,646 B2 | 9/2015 | Cory | |
| 9,361,603 B2 * | 6/2016 | Mendez | G06Q 10/10 |
| 9,366,222 B2 | 6/2016 | Nielsen et al. | |
| 10,823,140 B2 | 11/2020 | Samarasinha | |
| 2010/0215488 A1 * | 8/2010 | Santoro | F03D 3/0481 |
| | | | 415/208.1 |
| 2013/0195636 A1 * | 8/2013 | Poole | F03D 13/20 |
| | | | 415/203 |

FOREIGN PATENT DOCUMENTS

EP           1766231 B1      3/2016

* cited by examiner

*Primary Examiner* — Topaz L. Elliott
*Assistant Examiner* — Michael K. Reitz

(57) ABSTRACT

A vertical-axis renewable-power generator is an apparatus that is used to efficiently generate power in various weather conditions using renewable energy sources. The apparatus includes a vertically-oriented foil and a fluid turbine. The foil is designed to generate areas of relative high fluid velocity and low pressure on one side and relative lower fluid velocity and higher pressure on the opposite side. The foil is also self-directing so that the foil can follow the direction of the fluid flow. The fluid turbine is integrated into the foil so that the fluid turbine can be rotated by the high-speed fluid flow. The rotation of the fluid turbine can be used to generate electricity. The apparatus conforms to the Bernoulli's principle that is proven to increase the speed of the fluid flow over the foil, which is used to increase the speed of the fluid flow impacting the fluid turbine.

17 Claims, 10 Drawing Sheets

US 11,795,908 B2

VERTICAL-AXIS RENEWABLE-POWER GENERATOR

The current application claims a priority to the U.S. Provisional Patent Application Ser. No. 63/285,448 filed on Dec. 2, 2021.

FIELD OF THE INVENTION

The present invention relates to renewable power generation systems. More specifically, the present invention is a unique renewable energy system designed to generate power from fluid flow in either air or water.

BACKGROUND OF THE INVENTION

Recently, the demand for renewable energy has been a gradually growing worldwide. In general, renewable energy is energy generated from renewable resources that are naturally replenished on a human timescale. Renewable energy sources include sources such as wind, rain, tides, waves, rivers, geothermal heat, etc. Common renewable energy systems include wind turbines, wind power generators, water turbines, etc. However, to generate the power desired, most of these systems are often designed in such a large scale which limits the location where these systems can be installed. Further, most of these systems are severely limited to weather conditions for proper operation, which limits the time of operation of these systems. For example, most vertical-axis wind turbines require a 20 Miles per Hour (MPH) wind to function optimally, yet the average wind-speed across the United States is just 14 MPH. Thus, there is a need for a better renewable power generation system that can operate in slower fluid speeds and is scalable without losing the power output of the system.

An objective of the present invention is to provide a vertical-axis renewable-power generator that is more efficient at lower fluid speeds than current renewable power systems. The present invention is a portable, self-directing and efficient power generator that can operate during different weather conditions. The present invention can operate in severe weather conditions without damage and can also operate in normal weather conditions while still being able to generate enough power. Another objective of the present invention is to provide a vertical-axis renewable-power generator that requires low maintenance, has low manufacturing and installation costs, and requires no special materials and few electronic controls. Additional features and benefits of the present invention are further discussed in the sections below.

SUMMARY OF THE INVENTION

The present invention is a vertical-axis renewable-power generator. The present invention includes a vertical-oriented foil that is self-directing to follow the direction of the fluid flow. The vertical-oriented foil includes an integrated fluid turbine that is rotated by the high-speed fluid flow around the vertical-oriented foil. The present invention can also operate in various weather conditions without risk of damage to the vertical-oriented foil or the other components of the present invention. Due to the self-directing nature of the vertical-oriented foil, the present invention minimizes the damage to its components. In addition, the present invention can be more effective at generating power in various weather conditions using existing and accepted wing-lift knowledge. Further, the present invention can be scaled to meet the desired power output specifications and can be adapted to multiple installations. For example, the present invention can be mounted vertically as a wind power generator, or horizontally across a riverbed to generate electricity without requiring a dam or affecting fish migrations. The foil can include a pressure port that utilizes the pressure differential around the vertical-oriented foil to speed up the fluid turbine. Furthermore, the present invention can include means to control the movement of the vertical-oriented foil to prevent damage to the vertical-oriented foil during extreme conditions. For example, an air-brake mechanism can be included that will adjust the velocity of the fluid on both sides of the foil, thereby slowing the turbine as needed to keep it within optimal performance speeds.

DETAIL DESCRIPTIONS OF THE INVENTION

Figure 1:
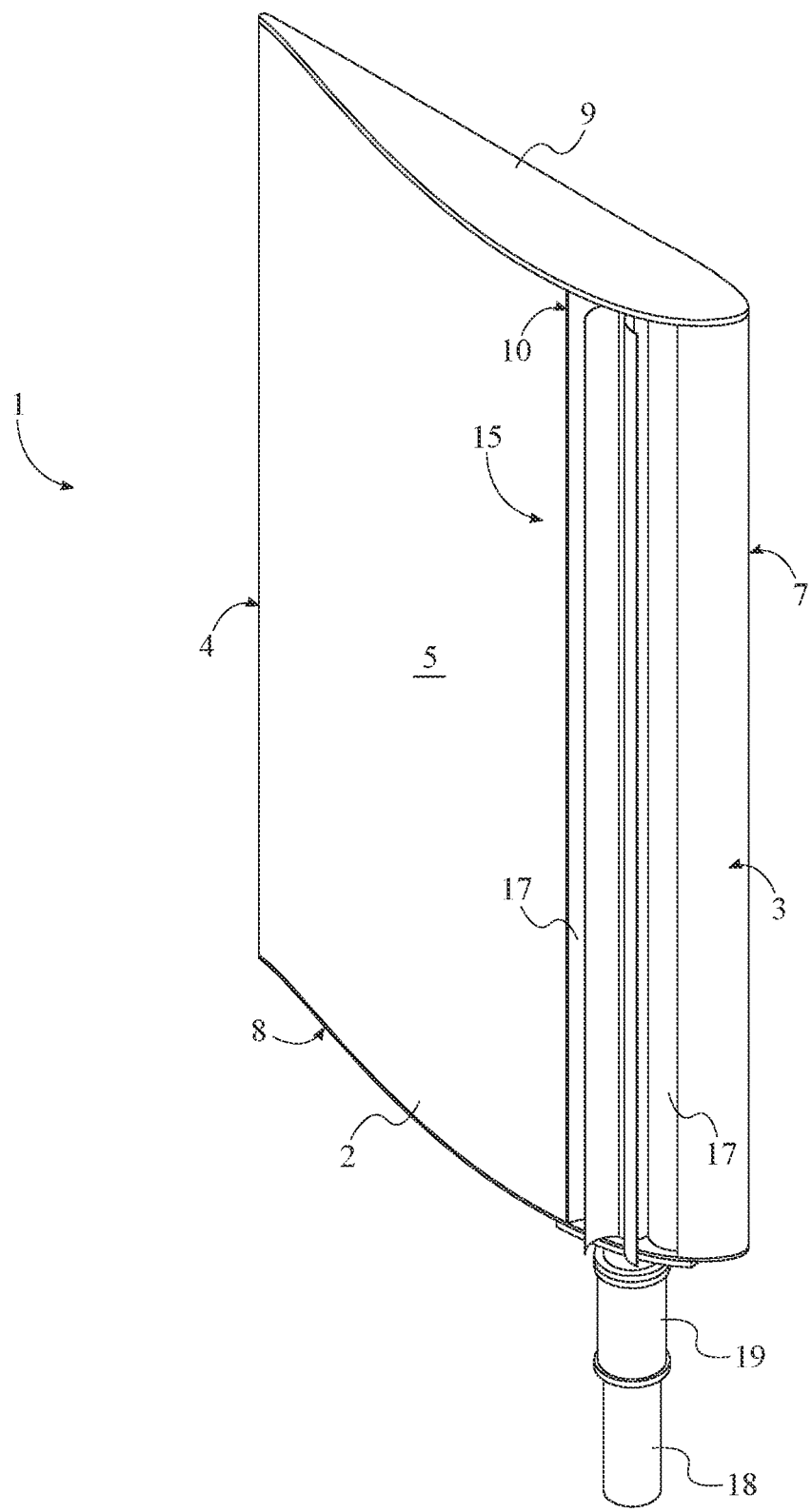
FIG. 1 is a top front perspective view of the present invention.
Figure 2:
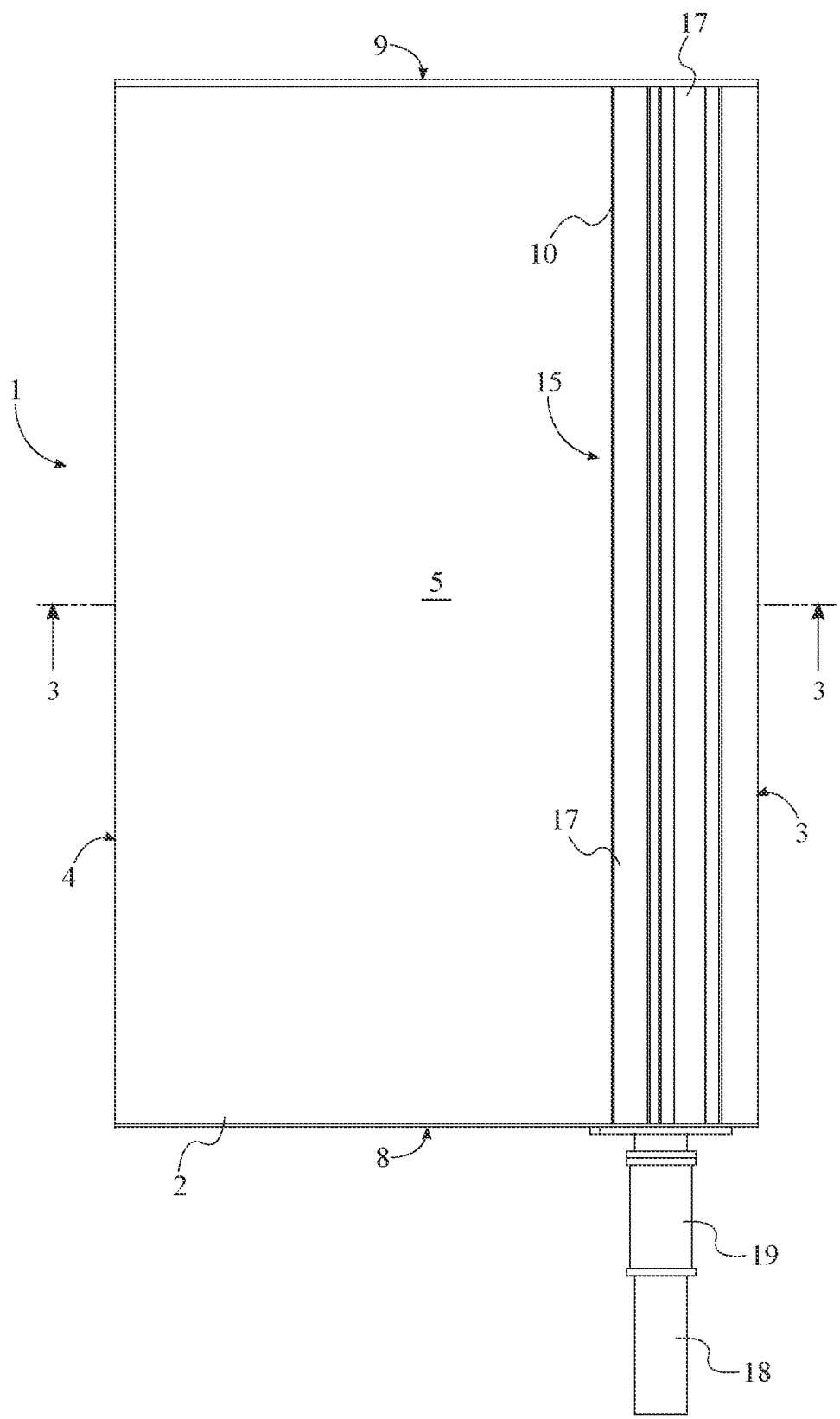
FIG. 2 is a lateral view of the low-pressure side of the vertically-oriented foil of the present invention, wherein a fluid turbine is shown partially exposed.
Figure 3:
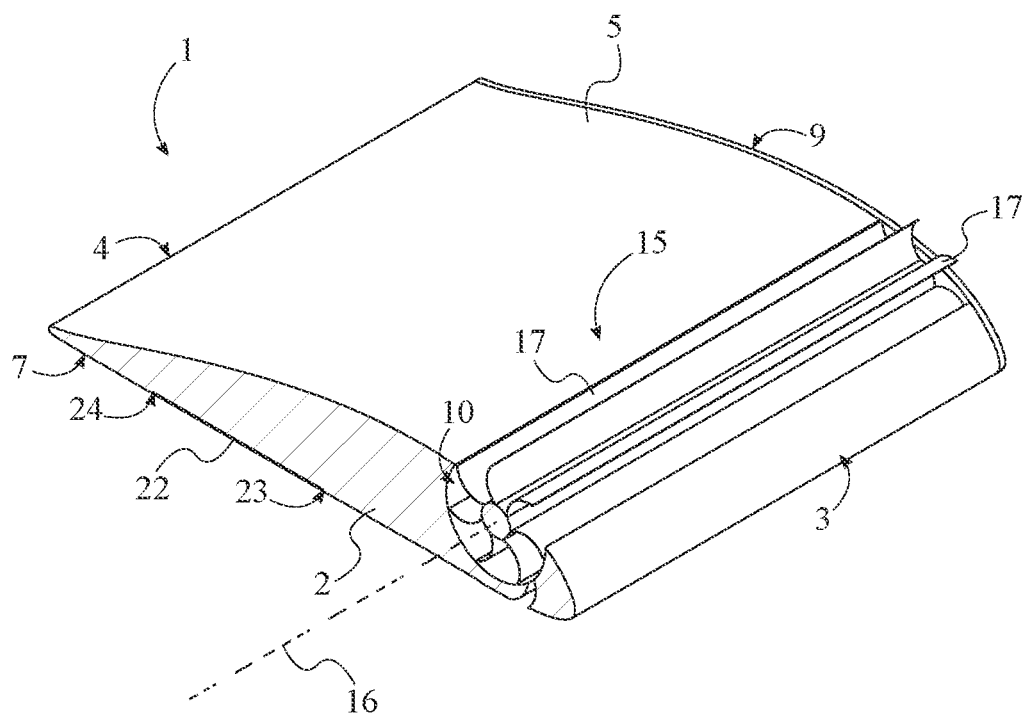
FIG. 3 is a perspective cross-sectional view of the present invention taken along line 3-3 in FIG. 2.
Figure 4:
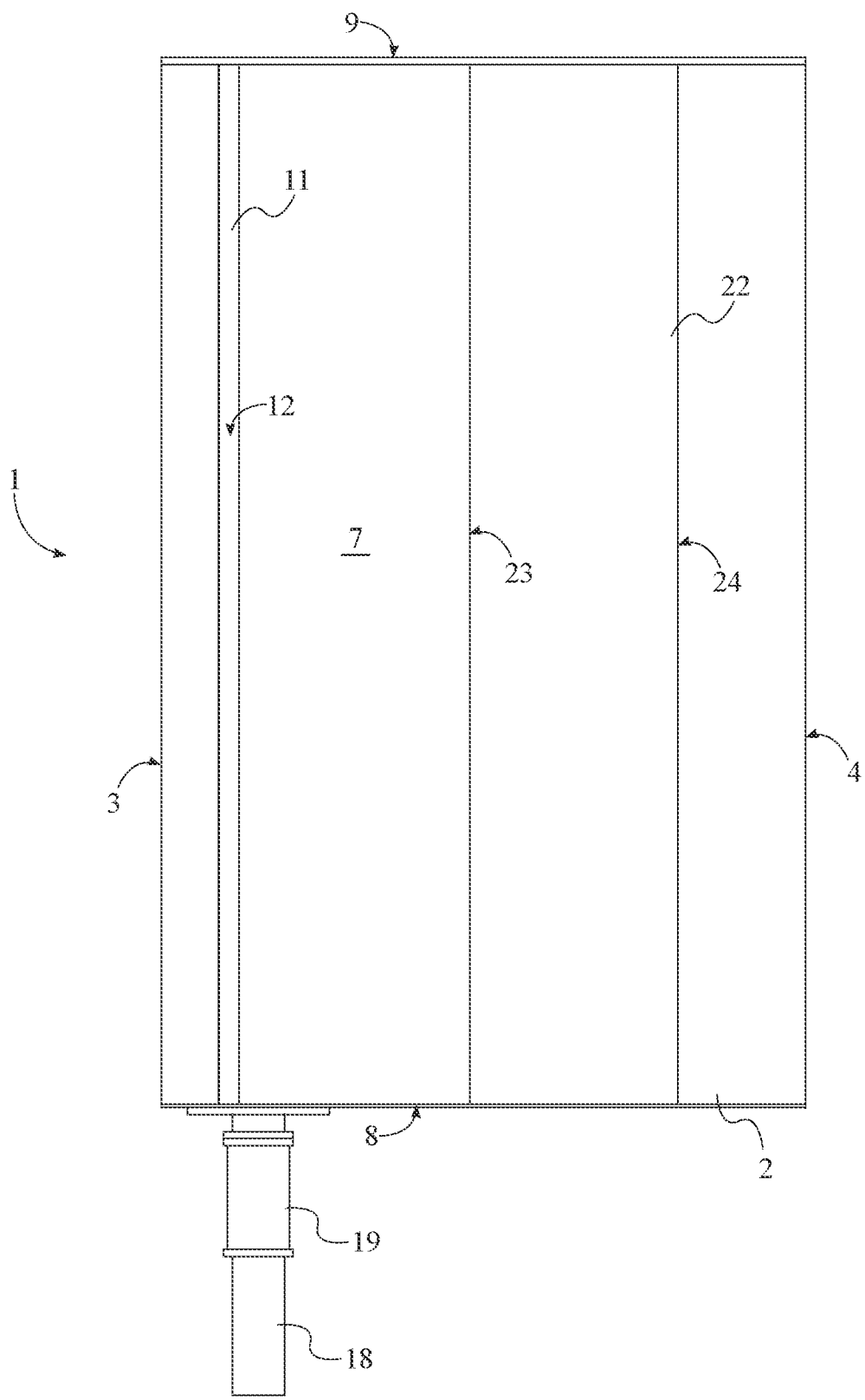
FIG. 4 is a lateral view of the high-pressure side of the vertically-oriented foil of the present invention.

All illustrations of the drawings are for the purpose of describing selected versions of the present invention and are not intended to limit the scope of the present invention.

The present invention is a vertical-axis renewable-power generator that is used to efficiently generate power in various weather conditions using renewable energy sources. As can be seen in FIGS. 1 through 7, the present invention comprises a vertically-oriented foil 1 and a fluid turbine 15. The vertically-oriented foil 1 is designed to generate areas of relative high fluid velocity and low pressure on one side, and relative lower fluid velocity and higher pressure on the opposite side. The vertically-oriented foil 1 is also designed to be self-correcting so that the vertically-oriented foil 1 can follow the direction of the fluid flow. The fluid turbine 15 is integrated into the vertically-oriented foil 1 to be rotated by the high-speed fluid flow. The rotation of the fluid turbine 15 can be used to generate electricity. The present invention conforms to the Bernoulli's principle that is proven to increase the speed of the fluid flow and thereby increasing the rotating speed of the fluid turbine 15.

The general configuration of the aforementioned components enables the generation of electrical energy from kinetic energy using renewable sources such as, but not limited to, wind or water. As can be seen in FIGS. 1 through 7, the vertically-oriented foil 1 comprises a foil body 2 and a turbine housing slot 10. The foil body 2 is designed to efficiently operate in the fluid of choice. For example, the foil body 2 can include an airfoil design so that the foil body 2 can efficiently operate in different wind conditions. The foil body 2 can also include a hydrofoil design so that the foil body 2 can efficiently operate in different water flow conditions. Accordingly, the foil body 2 comprises a leading edge 3, a trailing edge 4, a low-pressure and high fluid speed side 5, a high-pressure and low fluid speed side 7, a proximal side 8, and a distal side 9. The leading edge 3 preferably corresponds to the edge of the foil body 2 facing the incoming fluid flow. The trailing edge 4 preferably corresponds to the edge of the foil body 2 opposite to the leading edge 3. So, the leading edge 3 and the trailing edge 4 are positioned opposite to each other about the foil body 2. Further, the low-pressure side 5 corresponds to the side exposed to the low-pressure area of the fluid flow around the foil body 2. On the other hand, the high-pressure side 7 corresponds to the side exposed to the high-pressure area of the fluid flow around the foil body 2. Thus, the low-pressure side 5 and the high-pressure side 7 are positioned opposite to each other about the foil body 2.

Further, the proximal side 8 corresponds to the side that is mounted to a support structure. As can be seen in FIGS. 1 through 7, the distal side 9 corresponds to the side that is not supported. Thus, the fixed side and the free side are positioned opposite to each other about the foil body 2. Furthermore, the turbine housing slot 10 corresponds to the location where the fluid turbine 15 is mounted on the foil body 2. To accommodate the fluid turbine 15, the turbine housing slot 10 traverses into the foil body 2 from the low-pressure and high fluid speed side 5. In addition, the turbine housing slot 10 traverses through the foil body 2 from the proximal side 8 to the distal side 9. This way, the fluid turbine 15 can span the length of the foil body 2. The turbine housing slot 10 is also positioned adjacent to the leading edge 3 so that the fluid turbine 15 is exposed to the fluid flow with the highest speed. To secure the fluid turbine 15 to the foil body 2, the fluid turbine 15 is rotatably mounted into the turbine housing slot 10. In addition, a rotation axis 16 of the fluid turbine 15 is positioned parallel to the leading edge 3 so that the fluid turbine 15 is evenly exposed to the fluid flow with highest speed. The fluid turbine 15 also traverses out of the wing body from the turbine housing slot 10 and through the low-pressure side 5. This way, the fluid turbine 15 is exposed to the fluid flow travelling through the low-pressure and high-speed area of the fluid flow.

As can be seen in FIGS. 1 through 7, to facilitate the rotation of the fluid turbine 15 by the fluid flow travelling through the low-pressure area of the fluid flow, the fluid turbine 15 may further comprise a plurality of curved fins 17. The plurality of curved fins 17 includes several curved fins designed to be dragged by the fluid flow. To do so, the plurality of curved fins 17 is radially positioned around the rotation axis 16 of the fluid turbine 15. This enables the plurality of curved fins 17 to rotate the fluid turbine 15 as the fluid flow contact each of the plurality of curved fins 17. In addition, a chord line 6 of the low-pressure side 5 is intersected by the plurality of curved fins 17 to ensure that the fluid flow travelling over the high-speed side is in contact with some of the plurality of curved fins 17. As the curved fins being dragged by the fluid flow rotate the fluid turbine 15, the adjacent curved fins are exposed to the fluid flow. Thus, the fluid turbine 15 keeps rotating by any fluid flow travelling through the low-pressure and high-speed area of the fluid flow. In other embodiments, the plurality of curved fins 17 may include fins of different shape. Further, the fins may be arranged into different patterns, such as a helix pattern around the hub of the fluid turbine 15.

In some embodiments, to facilitate the generation of electricity, the present invention may further comprise a support shaft 18 and a generator 19. As can be seen in FIGS. 1 through 7, the support shaft 18 provides stability to the vertically-oriented foil 1 while enabling the foil body 2 to self-correct due to changes in the direction of the fluid flow. The generator 19 enables the conversion of the kinetic energy from the fluid turbine 15 into electrical energy. To do so, the generator 19 may comprise a rotor 20 and a stator 21. The rotor 20 preferably corresponds to the part of the generator 19 that is coupled to the fluid turbine 15. The stator 21 corresponds to the part of the generator 19 that is connected to the electrical system. Accordingly, the support shaft 18 is positioned parallel to the leading edge 3 to align the support shaft 18 to the fluid turbine 15. The proximal side 8 is also terminally positioned to the support shaft 18 so that the foil body 2 can be positioned upright. Further, the foil body 2 is rotatably mounted to the support shaft 18 to enable the foil body 2 to self-correct due to changes in the fluid flow. Furthermore, the rotor 20 is torsionally connected to the fluid turbine 15 to transmit the rotational motion of the fluid turbine 15 to the rotor 20.

Figure 5:
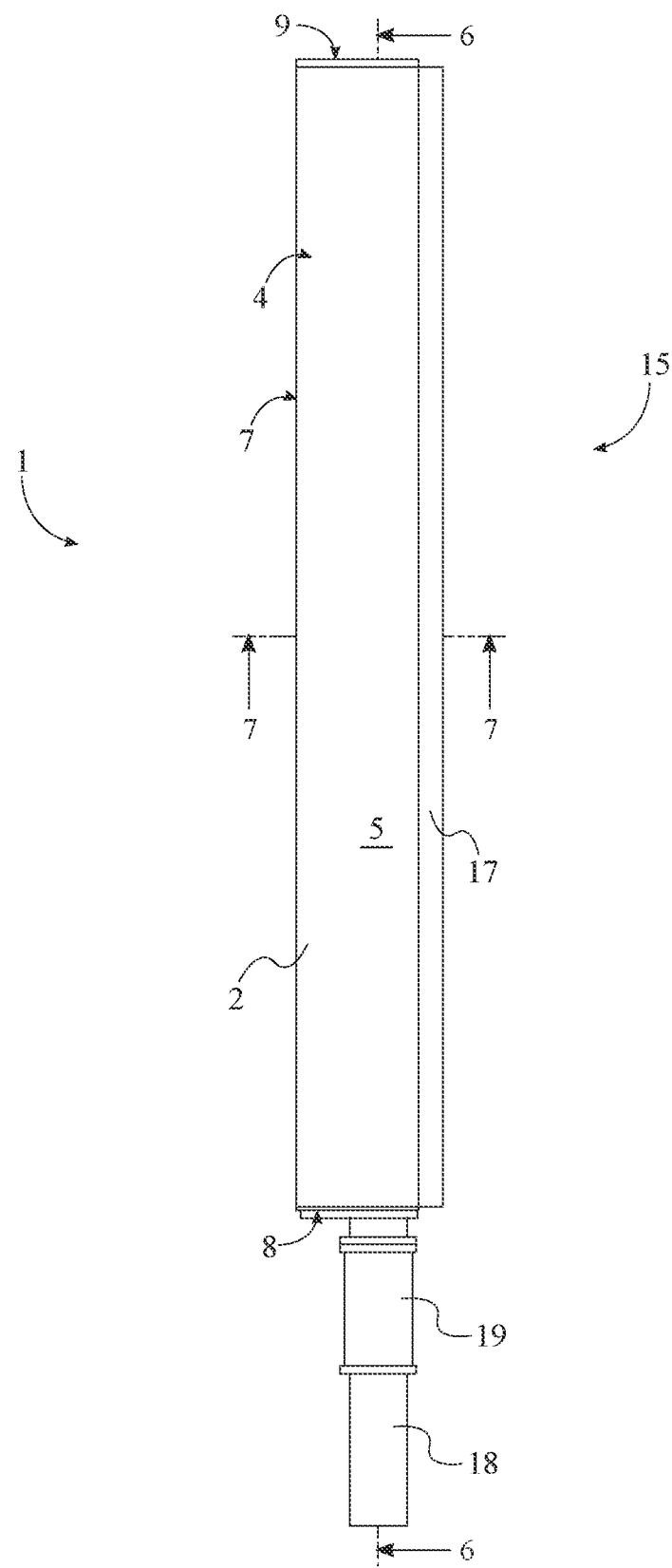
FIG. 5 is a lateral view of the leading edge of the vertically-oriented foil of the present invention.
Figure 6:
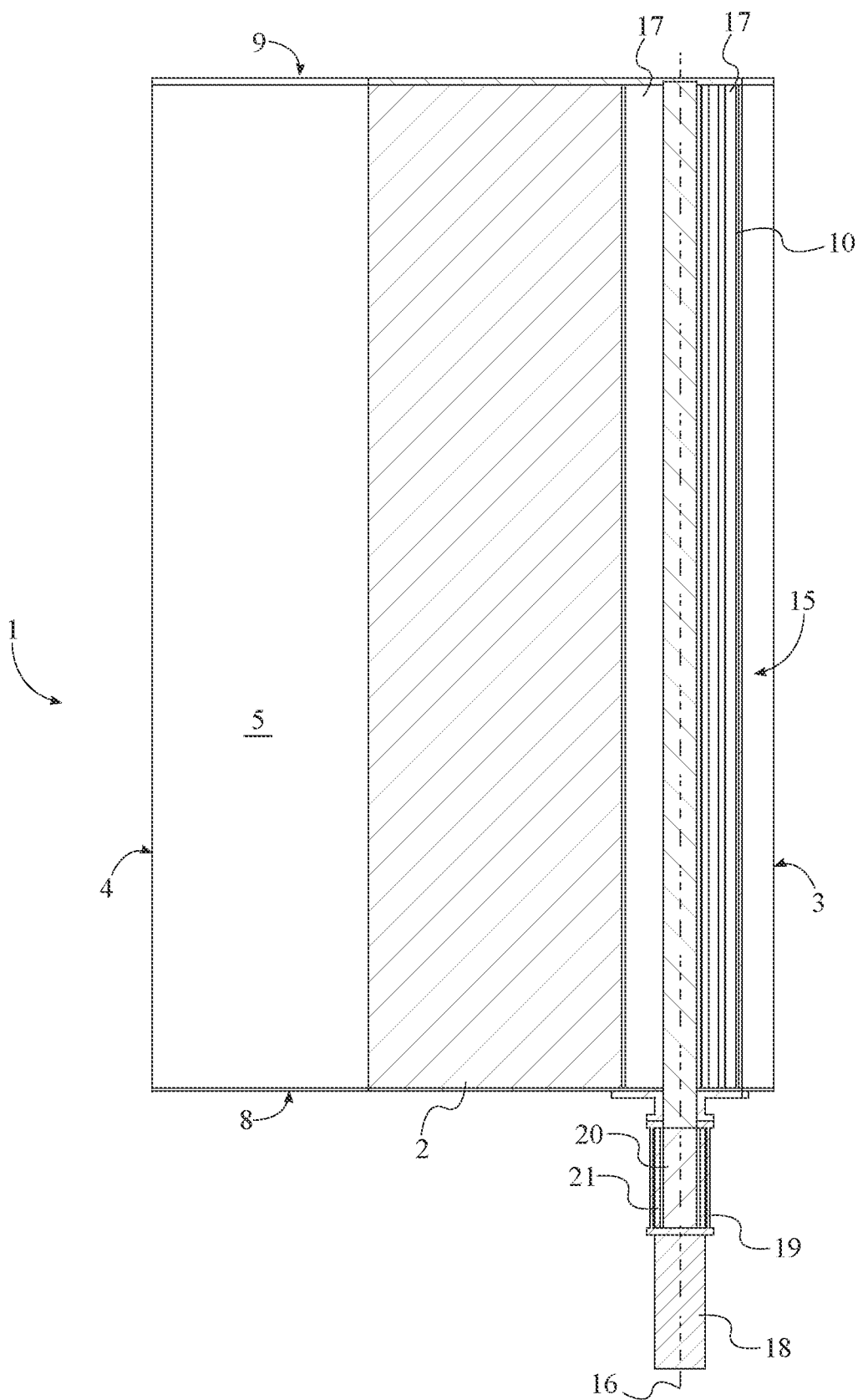
FIG. 6 is a vertical cross-sectional view of the present invention taken along line 6-6 in FIG. 5.
Figure 7:
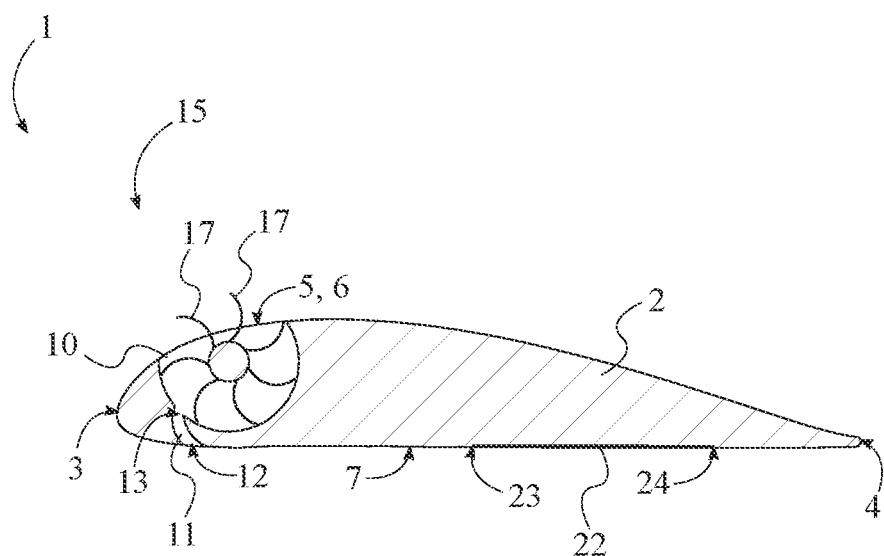
FIG. 7 is a vertical cross-sectional view of the present invention taken along line 7-7 in FIG. 5.

In some embodiments, as can be seen in FIGS. 5 through 7, the generator 19 may be incorporated into the support shaft 18 to provide a single structure that can be easily installed in the desired location. Accordingly, the support shaft 18 may be positioned collinear to the rotation axis 16 of the fluid turbine 15 so that the support shaft 18 is axially aligned with the fluid turbine 15. Further, the stator 21 may be mounted within the support shaft 18 so that the generator 19 can be housed within the support shaft 18. In other embodiments, the generator 19 or parts of the generator 19 may be housed external to the support shaft 18.

As can be seen in FIGS. 1 through 7, to ensure that the present invention is able to generate the desired electrical power from the available fluid flow, the vertically-oriented foil 1 may further comprise at least one pressure portal 11. The at least one pressure portal 11 enables fluid flow from the high-pressure area of the foil body 2 to move into the turbine housing slot 10 through the foil body 2. To do so, the at least one pressure portal 11 may comprise a portal inlet 12 and a portal outlet 13 corresponding to the openings of the at least one pressure portal 11. The portal inlet 12 traverses into the foil body 2 from the high-pressure side 7 to enable fluid flow from the high-pressure area of the foil body 2 into the turbine housing slot 10 through the at least one pressure portal 11. Further, the portal inlet 12 is positioned adjacent to the leading edge 3 to facilitate the fluid flow into the at least one pressure portal 11. On the other hand, the portal outlet 13 traverses out of the foil body 2 and into the turbine housing slot 10 to enable the fluid flow to enter the turbine housing slot 10. This way, the fluid turbine 15 can be rotated at higher speeds that are faster than the normal speeds of the fluid turbine 15 being exposed only to the fluid flow from the low-pressure area of the fluid flow. In some embodiments, the at least one pressure portal 11 can be repeated many times along the length of the foil body 2 to enable high volume of fluid flow through each. To do so, the several pressure portals 11 may traverse through the foil body 2 from the proximal side 8 to the distal side 9. In other embodiments, the several pressure portals 11 may span partial sections of the foil body 2.

Figure 8:
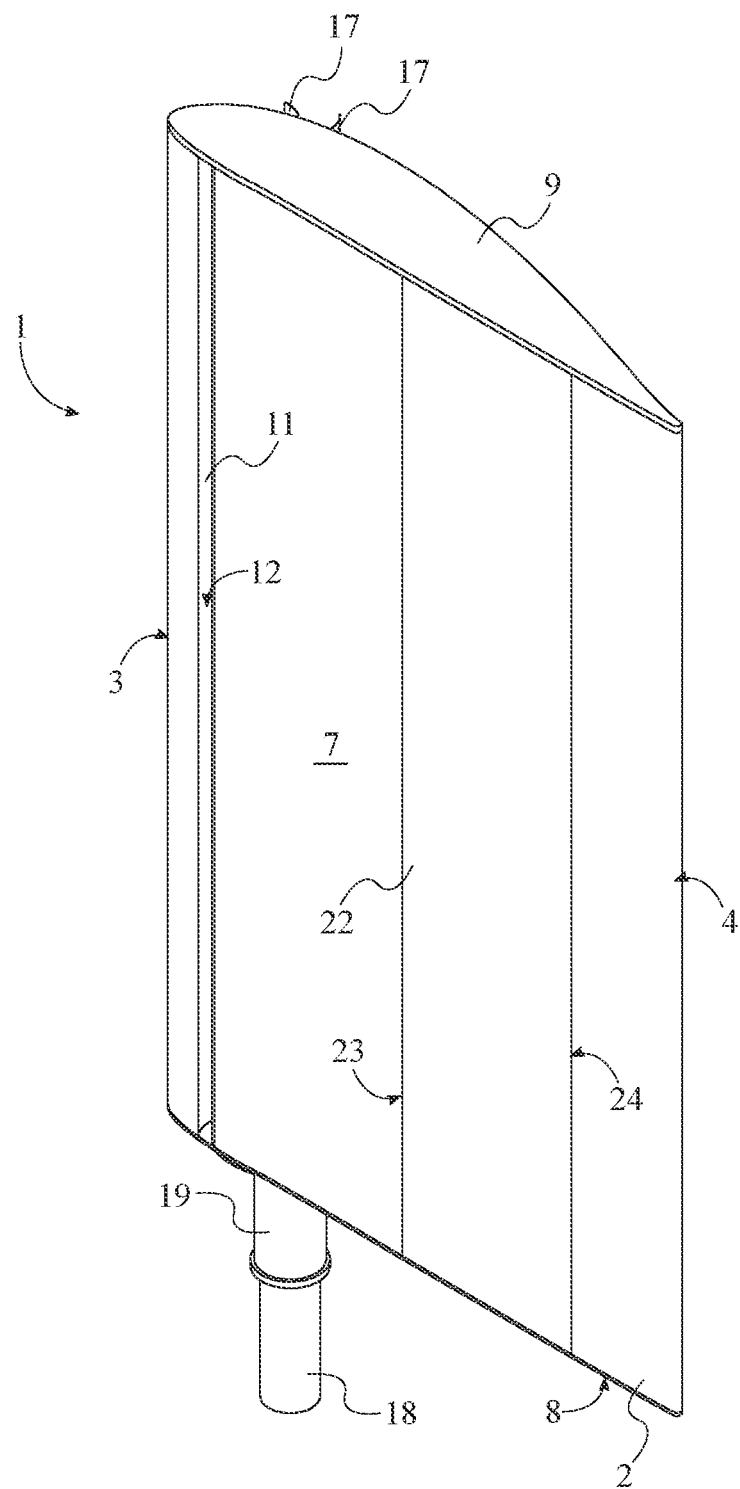
FIG. 8 is a top rear perspective view of the present invention.
Figure 9:
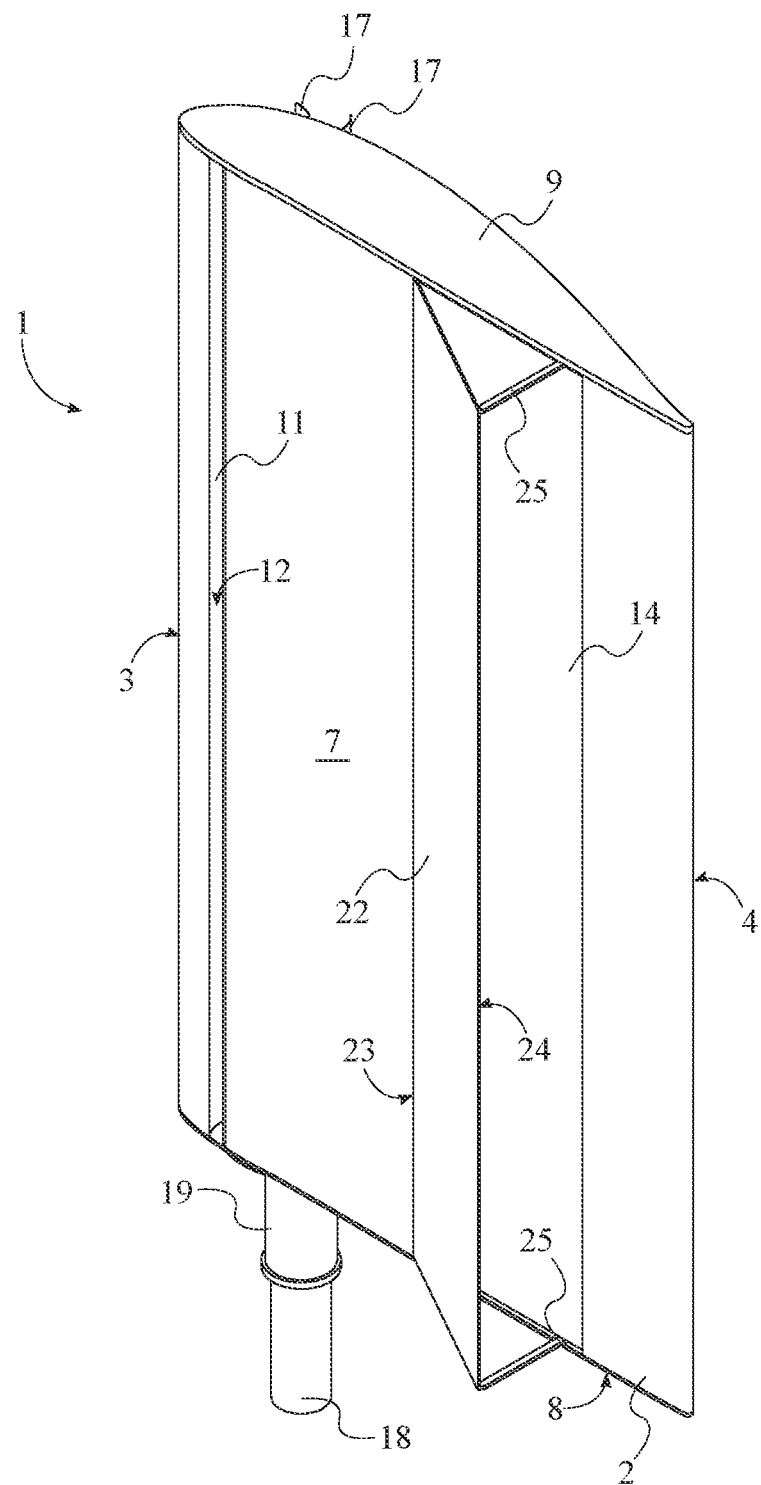
FIG. 9 is a top rear perspective view of the present invention, wherein an air-brake panel is shown deployed.
Figure 10:
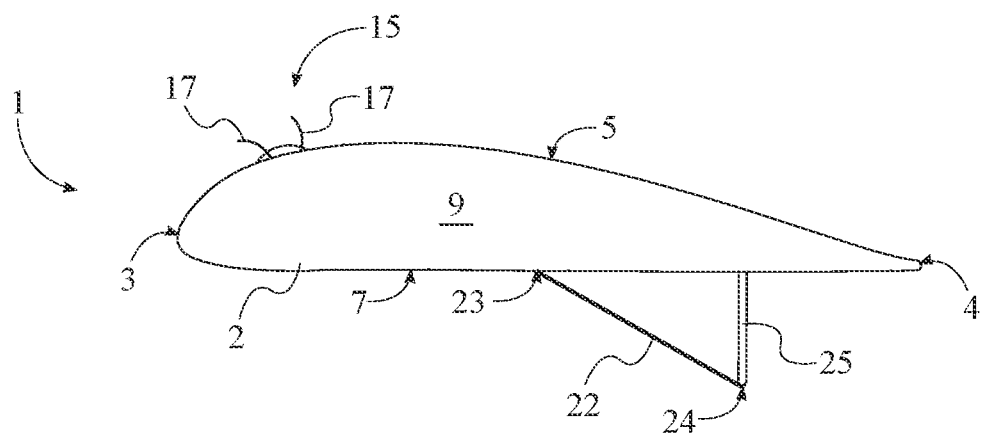
FIG. 10 is a lateral view of the distal side of the vertically-oriented foil of the present invention, wherein the air-brake panel is shown deployed.

In some embodiments, as can be seen in FIGS. 8 through 10, the present invention may further comprise an air-brake panel 22 that enables the control of the motion of the vertically-oriented foil 1. For example, during severe winds, the fluid turbine 15 could reach a harmful overspeed condition. The air-brake panel 22 disrupts the fluid flow on the high-pressure side of the foil body 2, causing the pressures and fluid speeds on either side of the foil body 2 to balance, thereby slowing, but not stopping, the fluid turbine 15. The vertically-oriented foil 1 may further comprise a panel recession 14 to retain the air-brake panel 22 when not in use. In addition, the air-brake panel 22 may comprise a fixed panel edge 23 and a free panel edge 24 corresponding to opposite edges of the air-brake panel 22. Accordingly, the fixed panel edge 23 and the free panel edge 24 are positioned opposite to each other across the air-brake panel 22 due to the overall length of the air-brake panel 22. Further, the panel recession 14 traverses into the foil body 2 so that the air-brake panel 22 is flushed against the low-pressure side 5 when stored away. The panel recession 14 is also positioned adjacent to the trailing edge 4 to position the air-brake panel 22 closer to the trailing edge 4, which increase the drag generated by the air-brake panel 22. Further, the fixed panel edge 23 is positioned offset from the trailing edge 4 so that the fixed panel edge 23 can match the location of the panel recession 14. The fixed panel edge 23 and the free panel edge 24 are also positioned parallel to the trailing edge 4 so that the air-brake panel 22 generates drag evenly across the foil body 2. The free panel edge 24 is also positioned in between the fixed panel edge 23 and the trailing edge 4 so that the free panel edge 24 also matches the position of the panel recession 14. Furthermore, the fixed panel edge 23 is positioned within the panel recession 14. The fixed panel edge 23 is also hingedly connected to the foil body 2 to secure the air-brake panel 22 to the foil body 2. This way, when the air-brake panel 22 is not in use, the air-brake panel 22 perfectly fits within the panel recession 14. When the air-brake panel 22 is deployed, the free panel edge 24 is separated from the foil body 2 while the fixed panel edge 23 keeps the air-brake panel 22 connected to the foil body 2, as shown in FIGS. 9 and 10.

As can be seen in FIGS. 8 through 10, to control the deployment of the air-brake panel 22, the present invention may further comprise a panel deployment mechanism 25. The panel deployment mechanism 25 enables the controlled deployment of the air-brake panel 22 so that the air-brake panel 22 does not accidentally deploy during normal weather conditions. Accordingly, the panel deployment mechanism 25 is operatively integrated in between the foil body 2 and the air-brake panel 22. The panel deployment mechanism 25 is used to selectively offset the free panel edge 24 away from the foil body 2 in order to increase an aerodynamic drag experienced by the foil body 2. For example, the panel deployment mechanism 25 can be a hydraulic mechanism that includes several hydraulic lifts connected in between the air-brake panel 22 and the foil body 2. The panel deployment mechanism 25 may also include a controller that selectively engages the hydraulic lifts under predetermined conditions. The controller may also enable the remote control of the panel deployment mechanism 25. In other embodiments, the panel deployment mechanism 25 may include non-hydraulic means that enable the controlled deployment of the air-brake panel 22.

Although the invention has been explained in relation to its preferred embodiment, it is to be understood that many other possible modifications and variations can be made without departing from the spirit and scope of the invention.

What is claimed is:

1. A vertical-axis renewable-power generator comprising:
a vertically-oriented foil;
a fluid turbine;
an air-brake panel;
the vertically-oriented foil comprising a foil body, a turbine housing slot, and a panel recession;
the air-brake panel comprising a fixed panel edge and a free panel edge;
the foil body comprising a leading edge, a trailing edge, a low-pressure side, a high-pressure side, a proximal side, and a distal side;
the leading edge and the trailing edge being positioned opposite to each other about the foil body;
the low-pressure side and the high-pressure side being positioned opposite to each other about the foil body;
the proximal side and the distal side being positioned opposite to each other about the foil body;
the turbine housing slot traversing into the foil body from the low-pressure side;
the turbine housing slot traversing through the foil body from the proximal side to the distal side;
the turbine housing slot being positioned adjacent to the leading edge;
the fluid turbine being rotatably mounted into the turbine housing slot;
a rotation axis of the fluid turbine being positioned parallel to the leading edge;
the fluid turbine traversing out of the foil body from the turbine housing slot and through the low-pressure side;
the fixed panel edge and the free panel edge being positioned opposite to each other across the air-brake panel;
the panel recession traversing into the foil body;
the panel recession being positioned adjacent to the trailing edge;
the fixed panel edge being positioned offset from the trailing edge;
the fixed panel edge and the free panel edge being positioned parallel to the trailing edge;
the free panel edge being positioned in between the fixed panel edge and the trailing edge;
the fixed panel edge being positioned within the panel recession; and
the fixed panel edge being hingedly connected to the foil body.

2. The vertical-axis renewable-power generator as claimed in claim 1 comprising:
the fluid turbine comprising a plurality of curved fins;
the plurality of curved fins being radially positioned around the rotation axis of the fluid turbine; and
a chord line of the low-pressure side being intersected by the plurality of curved fins.

3. The vertical-axis renewable-power generator as claimed in claim 1 comprising:
a support shaft;
a generator;
the generator comprising a rotor and a stator;
the support shaft being positioned parallel to the leading edge;
the proximal side being positioned at an end of the support shaft;
the foil body being rotatably mounted to the support shaft; and
the rotor being torsionally connected to the fluid turbine.

4. The vertical-axis renewable-power generator as claimed in claim 3 comprising:
the support shaft being positioned collinear to the rotation axis of the fluid turbine.

5. The vertical-axis renewable-power generator as claimed in claim 3 comprising:
the stator being mounted within the support shaft.

6. The vertical-axis renewable-power generator as claimed in claim 1 comprising:
the vertically-oriented foil comprising at least one pressure portal;
the at least one pressure portal comprising a portal inlet and a portal outlet;
the portal inlet traversing into the foil body from the high-pressure side;
the portal inlet being positioned adjacent to the leading edge; and
the portal outlet traversing out of the foil body and into the turbine housing slot.

7. The vertical-axis renewable-power generator as claimed in claim 6 comprising:
the at least one pressure portal traversing through the foil body from the proximal side to the distal side.

8. The vertical-axis renewable-power generator as claimed in claim 1 comprising:
a panel deployment mechanism; and
the panel deployment mechanism being operatively integrated in between the foil body and the air-brake panel, wherein the panel deployment mechanism is used to selectively offset the free panel edge away from the foil body in order to increase an aerodynamic drag experienced by the foil body.

9. A vertical-axis renewable-power generator comprising:
a vertically-oriented foil;
a fluid turbine;
an air-brake panel;
the vertically-oriented foil comprising a foil body, a turbine housing slot, and a panel recession;
the air-brake panel comprising a fixed panel edge and a free panel edge;
the foil body comprising a leading edge, a trailing edge, a low-pressure side, a high-pressure side, a proximal side, and a distal side;
the fluid turbine comprising a plurality of curved fins;
the leading edge and the trailing edge being positioned opposite to each other about the foil body;
the low-pressure side and the high-pressure side being positioned opposite to each other about the foil body;
the proximal side and the distal side being positioned opposite to each other about the foil body;
the turbine housing slot traversing into the foil body from the low-pressure side;
the turbine housing slot traversing through the foil body from the proximal side to the distal side;
the turbine housing slot being positioned adjacent to the leading edge;
the fluid turbine being rotatably mounted into the turbine housing slot;
a rotation axis of the fluid turbine being positioned parallel to the leading edge;
the fluid turbine traversing out of the foil body from the turbine housing slot and through the low-pressure side;
the plurality of curved fins being radially positioned around the rotation axis of the fluid turbine; and
a chord line of the low-pressure side being intersected by the plurality of curved fins;
the fixed panel edge and the free panel edge being positioned opposite to each other across the air-brake panel;
the panel recession traversing into the foil body;
the panel recession being positioned adjacent to the trailing edge;
the fixed panel edge being positioned offset from the trailing edge;
the fixed panel edge and the free panel edge being positioned parallel to the trailing edge;
the free panel edge being positioned in between the fixed panel edge and the trailing edge;
the fixed panel edge being positioned within the panel recession; and
the fixed panel edge being hingedly connected to the foil body.

10. The vertical-axis renewable-power generator as claimed in claim 9 comprising:
a support shaft;
a generator;
the generator comprising a rotor and a stator;
the support shaft being positioned parallel to the leading edge;
the proximal side being positioned at an end of the support shaft;
the foil body being rotatably mounted to the support shaft; and
the rotor being torsionally connected to the fluid turbine.

11. The vertical-axis renewable-power generator as claimed in claim 10 comprising:
the support shaft being positioned collinear to the rotation axis of the fluid turbine; and
the stator being mounted within the support shaft.

12. The vertical-axis renewable-power generator as claimed in claim 9 comprising:
the vertically-oriented foil comprising at least one pressure portal;
the at least one pressure portal comprising a portal inlet and a portal outlet;
the portal inlet traversing into the foil body from the high-pressure side;
the portal inlet being positioned adjacent to the leading edge;
the portal outlet traversing out of the foil body and into the turbine housing slot; and
the at least one pressure portal traversing through the foil body from the proximal side to the distal side.

13. The vertical-axis renewable-power generator as claimed in claim 9 comprising:
a panel deployment mechanism; and
the panel deployment mechanism being operatively integrated in between the foil body and the air-brake panel, wherein the panel deployment mechanism is used to selectively offset the free panel edge away from the foil body in order to increase an aerodynamic drag experienced by the foil body.

14. A vertical-axis renewable-power generator comprising:
a vertically-oriented foil;
a fluid turbine;
a support shaft;
a generator;
an air-brake panel;
the vertically-oriented foil comprising a foil body, a turbine housing slot, and a panel recession;
the foil body comprising a leading edge, a trailing edge, a low-pressure side, a high-pressure side, a proximal side, and a distal side;
the generator comprising a rotor and a stator;
the air-brake panel comprising a fixed panel edge and a free panel edge;

the leading edge and the trailing edge being positioned opposite to each other about the foil body;

the low-pressure side and the high-pressure side being positioned opposite to each other about the foil body;

the proximal side and the distal side being positioned opposite to each other about the foil body;

the turbine housing slot traversing into the foil body from the low-pressure side;

the turbine housing slot traversing through the foil body from the proximal side to the distal side;

the turbine housing slot being positioned adjacent to the leading edge;

the fluid turbine being rotatably mounted into the turbine housing slot;

a rotation axis of the fluid turbine being positioned parallel to the leading edge;

the fluid turbine traversing out of the foil body from the turbine housing slot and through the low-pressure side;

the support shaft being positioned parallel to the leading edge;

the proximal side being positioned at an end of the support shaft;

the foil body being rotatably mounted to the support shaft;

the rotor being torsionally connected to the fluid turbine;

the support shaft being positioned collinear to the rotation axis of the fluid turbine;

the stator being mounted within the support shaft;

the fixed panel edge and the free panel edge being positioned opposite to each other across the air-brake panel;

the panel recession traversing into the foil body;

the panel recession being positioned adjacent to the trailing edge;

the fixed panel edge being positioned offset from the trailing edge;

the fixed panel edge and the free panel edge being positioned parallel to the trailing edge;

the free panel edge being positioned in between the fixed panel edge and the trailing edge;

the fixed panel edge being positioned within the panel recession; and the fixed panel edge being hingedly connected to the foil body.

15. The vertical-axis renewable-power generator as claimed in claim 14 comprising:

the fluid turbine comprising a plurality of curved fins;

the plurality of curved fins being radially positioned around the rotation axis of the fluid turbine; and a chord line of the low-pressure side being intersected by the plurality of curved fins.

16. The vertical-axis renewable-power generator as claimed in claim 14 comprising:

the vertically-oriented foil comprising at least one pressure portal;

the at least one pressure portal comprising a portal inlet and a portal outlet;

the portal inlet traversing into the foil body from the high-pressure side;

the portal inlet being positioned adjacent to the leading edge;

the portal outlet traversing out of the foil body and into the turbine housing slot; and the at least one pressure portal traversing through the foil body from the proximal side to the distal side.

17. The vertical-axis renewable-power generator as claimed in claim 14 comprising:

a panel deployment mechanism; and the panel deployment mechanism being operatively integrated in between the foil body and the air-brake panel, wherein the panel deployment mechanism is used to selectively offset the free panel edge away from the foil body in order to increase an aerodynamic drag experienced by the foil body.

\* \* \* \* \*